No. 629,096. Patented July 18, 1899.
N. P. STEVENS.
SPARK ARRESTER.
(Application filed Apr. 10, 1899.)
(No Model.)
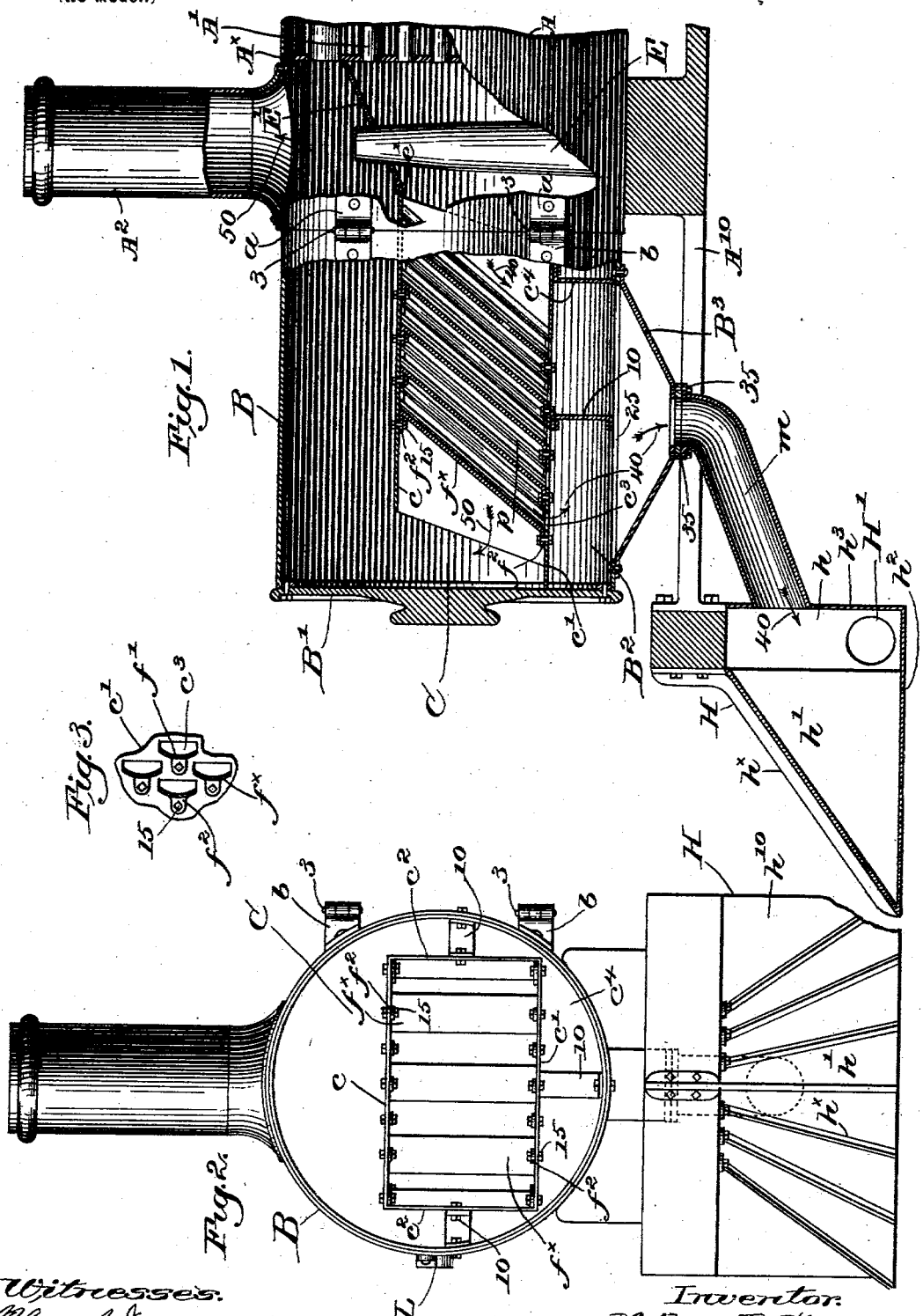
Witnesses:
Thomas J. Drummond
James M. Urquhart
Inventor:
Nathan P. Stevens
By Crosby Gregory Attys.

UNITED STATES PATENT OFFICE.

NATHAN P. STEVENS, OF CONCORD, NEW HAMPSHIRE.

SPARK-ARRESTER.

SPECIFICATION forming part of Letters Patent No. 629,096, dated July 18, 1899.

Application filed April 10, 1899. Serial No. 712,475. (No model.)

*To all whom it may concern:*

Be it known that I, NATHAN P. STEVENS, of Concord, county of Merrimac, State of New Hampshire, have invented an Improvement in Spark-Arresters, of which the following description, in connection with the accompanying drawings, is a specification, like letters and figures on the drawings representing like parts.

This invention has for its object the production of novel and effective spark-arresting apparatus for boilers, particularly adapted for locomotives, whereby sparks and cinders are prevented from passing out with the exhaust.

I have also herein provided a novel and convenient receptacle to which I prefer to conduct the collected cinders, said receptacle being emptied from time to time, as necessary.

I have also provided means for obtaining ready access to the smoke-box or portion of the boiler in which the spark-arresting apparatus is located.

My invention is herein illustrated in connection with a locomotive-engine, inasmuch as such use thereof is extensive, as will appear hereinafter, although my invention is not restricted thereto.

Figure 1, in vertical longitudinal section, represents the forward end of a locomotive-boiler with the smoke-box and exhaust-outlet, one form of my novel spark-arrester being shown in operative position in the smoke-box, other features of my invention also being therein illustrated. Fig. 2 is a front elevation of the apparatus shown in Fig. 1, the head or outer end of the smoke-box being omitted; and Fig. 3 is a horizontal sectional detail of the baffles, taken on the line $x$, Fig. 1.

The boiler-shell A, fire-tubes $A'$, smoke-stack $A^2$, and the upturned exhaust pipe or outlet E, Fig. 1, may be and are of usual construction.

The smoke-box B is in itself of substantially well-known construction; but I have herein provided the same with ears $b$, which constitute hinge members, the other members $a$ being attached to or formed on the open front end of the boiler, suitable pintles, as 3, connecting the hinge members, so that the smoke-box may be swung laterally to one side when it is desired to have access to the contents thereof—as, for instance, for cleaning or for any other purpose.

Any suitable locking device, as L, may be provided to retain the smoke-box in normal position, forming a prolongation of the boiler, the inner end of the smoke-box being open and its outer end closed by a head $B'$.

An inclined deflector-plate $E'$ extends from the tube-sheet $A^\times$ forward to the inner end of the spark-arrester, to be described, the exhaust-outlet E passing up through the plate, so that the products of combustion are deflected toward the lower part of the boiler.

I have herein shown the spark-arrester as consisting of an open-ended chamber having parallel top and bottom members $c$ $c'$, respectively, and sides $c^2$, suitably supported in any desirable manner in the smoke-box, and I have herein shown straps or brackets, as 10, attached to the chamber and to the interior of the smoke-box to support said chamber in the position shown in Figs. 1 and 2. The top $c$ of the chamber at its inner end is adapted to enter a recess or groove, as $e'$, formed in the forward end of the deflector-plate $E'$, the products of combustion being deflected by said plate to the inner end of the chamber, which is the inlet, while the gaseous matter escapes from its outer end or outlet to the smoke-box, from which it is discharged through the stack. The bottom $c'$ of the chamber at its outer end abuts against the head $B'$ of the smoke-box to prevent any back or down draft.

A series of comparatively narrow and laterally-staggered baffles $f^\times$ are located in the chamber, said baffles being concaved on their inlet sides, as at $f'$, (best shown in Fig. 3,) and the baffles are herein shown as concavo-convex in cross-section and provided with lugs $f^2$ at their ends, whereby they are attached to the top and bottom of the chamber in any suitable manner, as by bolts 15. Adjacent the lower ends of these baffles and at their inlet sides the bottom plate $c'$ is provided with a series of cinder outlets or openings $c^3$, the baffles being preferably inclined, as herein shown, from the bottom plate upward and rearwardly to the top plate $c$.

The sparks and cinders entering the chamber from the boiler impinge against the baffles and are directed by the curved inlet sides thereof to the bottom of the chamber and through the cinder-outlets $c^3$, passing thence to the compartment $B^2$ at the bottom of the smoke-box, said compartment preferably being closed at its rear end by a segmental plate $c^4$, which may be attached to and depend from the bottom $c^3$ of the baffle-chamber.

The construction of the chamber with flat top and bottom plates provides a very simple and effective means for attaching the baffles thereto, and the latter can thus be made of uniform length and practically interchangeable, while at the same time the cinder-receiving space $B^2$ in the smoke-box is of considerable size.

It will be obvious that the sparks and cinders collected by the arresting device and deposited in the lower part of the smoke-box can be conveyed to any suitable point, and I have herein provided a novel receptacle of sufficient size to retain a large quantity of the cinders, so that blowing out or emptying of such receptacle is only necessary at comparatively long intervals. The receptacle is herein shown as an inclosed or box-like cowcatcher supported on a suitable frame or an extension $A^{10}$ of the main frame, the cowcatcher being preferably made of sheet-iron, with sides $h$, angular top $h'$, bottom $h^2$, and back $h^3$, the top portion $h'$ being provided with heavy metal strengthening-ribs $h^\times$ and the whole shaped substantially as the usual cow-catcher, the top portions being bent up, as at $h^{10}$, to meet the sides $h$. The cow-catcher so constructed forms a closed or box-like receptacle of large capacity, and I have herein shown it connected, as by a duct $m$, with a hopper-like bottom $B^3$, secured to the under side of the smoke-box in any suitable manner and communicating therewith through a slot or opening 25 in the smoke-box. The hopper-bottom $B^3$ is herein shown as connected by bolts 35 with the upper end of the duct $m$, so that the latter can be detached when it is desired to swing the smoke-box to one side.

The cow-catcher or cinder-receptacle H may be provided with normally-closed blow-out openings H', as shown in Fig. 1.

It will be manifest that the products of combustion as they pass from the flues will be deflected by the plate E' into the open-ended chamber C, traveling through the tortuous passages formed by the baffles $f^\times$, and the sparks and cinders or the major portion thereof will be conducted to and discharged through the outlets $c^3$ into the lower part of the smoke-box and thence into the hopper-bottom $B^3$, and the collected cinders and sparks pass thence by gravity to the cinder-receptacle or cow-catcher H.

The draft created by the exhaust will draw the gaseous products of combustion through the chamber C and through its open outer end into the smoke-box, whence such gaseous matter will be discharged through the stack substantially free from sparks or cinders.

Inasmuch as the spark-arresting chamber C may be supported in any suitable manner in the smoke-box, my invention is not restricted to the particular means herein shown, as I have merely illustrated one practical mode of support.

The arrows 40 on Fig. 1 indicate the direction of travel of the cinders or sparks and the arrows 50 the passage of the gaseous products of combustion.

My invention is not restricted to the precise construction and arrangement shown and described, as the same may be modified and rearranged in many particulars without departing from the spirit and scope of my invention.

Having fully described my invention, what I claim, and desire to secure by Letters Patent, is—

1. A spark-arrester comprising a chamber to receive the products of combustion and having inlet and outlet openings, a series of laterally-staggered imperforate baffles intermediate said openings and concaved on their inlet sides, and cinder-outlets in the chamber adjacent the lower ends and at the inlet sides of the baffles.

2. A spark-arrester comprising a chamber to receive the products of combustion and having inlet and outlet openings, a series of laterally-staggered, concavo-convex imperforate baffles inclined from the top to the bottom of said chamber with their concave sides toward the inlet, and cinder-outlets in said chamber adjacent the lower ends and at the inlet sides of the baffles.

3. A spark-arrester comprising an open-ended elongated chamber having its top and bottom parallel, to receive products of combustion at one end and having an outlet at its other end, laterally-staggered imperforate baffles inclined from the top to the bottom of the chamber and concave at their inlet sides, and cinder-outlets adjacent the lower ends and at the inlet sides of the baffles.

4. A spark-arrester comprising a chamber to receive the products of combustion and having inlet and outlet openings, a series of laterally-staggered imperforate baffles intermediate said openings and extended from the top to the bottom of the chamber, and cinder-outlets in the chamber adjacent the lower ends and at the inlet sides of the baffles.

5. In a locomotive, a spark-arrester having inlet and outlet openings for the products of combustion, staggered baffles intermediate said openings, cinder-outlets adjacent the lower ends and at the inlet sides of the baffles, a box-like cow-catcher, and a connection between it and the several cinder-outlets, to convey cinders to the said cow-catcher.

6. In a locomotive, a spark-arrester into which the products of combustion pass, an inclosed or box-like cow-catcher, and means to convey cinders from the spark-arrester to the cow-catcher.

7. In a locomotive, a smoke-box, a spark-arrester therein having cinder-outlets communicating with a chamber in the bottom of the smoke-box, an inclosed cow-catcher, and a connection between said chamber and the cow-catcher, to convey cinders to the latter from the chamber.

In testimony whereof I have signed my name to this specification in the presence of two subscribing witnesses.

NATHAN P. STEVENS.

Witnesses:
JOHN C. EDWARDS,
AUGUSTA E. DEAN.